United States Patent [19]

Pentheroudakis

[11] Patent Number: 5,724,594

[45] Date of Patent: Mar. 3, 1998

[54] METHOD AND SYSTEM FOR AUTOMATICALLY IDENTIFYING MORPHOLOGICAL INFORMATION FROM A MACHINE-READABLE DICTIONARY

[75] Inventor: Joseph E. Pentheroudakis, Seattle, Wash.

[73] Assignee: Microsoft Corporation, Redmond, Wash.

[21] Appl. No.: 195,346

[22] Filed: Feb. 10, 1994

[51] Int. Cl.$^6$ .................................................. G06F 17/27
[52] U.S. Cl. ............................................ 395/760; 395/794
[58] Field of Search ......................... 364/419.02, 419.08, 364/900 MS File; 395/792–794, 760, 795

[56] References Cited

U.S. PATENT DOCUMENTS

| | | | |
|---|---|---|---|
| 4,775,956 | 10/1988 | Kaji et al. | 395/757 |
| 4,796,185 | 1/1989 | Yoshimura et al. | 395/760 |
| 4,959,785 | 9/1990 | Yamamoto et al. | 395/795 |
| 5,099,425 | 3/1992 | Kanno et al. | |
| 5,099,426 | 3/1992 | Carlgren et al. | 395/759 |
| 5,225,981 | 7/1993 | Yokogawa | 395/759 |
| 5,227,971 | 7/1993 | Nakajima et al. | |
| 5,243,520 | 9/1993 | Jacobs et al. | 364/419.08 |
| 5,251,129 | 10/1993 | Jacobs et al. | 364/419.08 |
| 5,276,616 | 1/1994 | Kuga et al. | 364/419.08 |
| 5,311,429 | 5/1994 | Tominaga | 364/419.02 |
| 5,321,608 | 6/1994 | Namba et al. | 364/419.08 |
| 5,357,430 | 10/1994 | Rackow et al. | 395/759 |
| 5,406,480 | 4/1995 | Kanno | 364/419.08 |
| 5,418,717 | 5/1995 | Su et al. | 364/419.08 |

OTHER PUBLICATIONS

Proctor, Paul (ed.), *Longman Dictionary of Contemporary English*, Longman Group Limited, United Kingdom, 1978, pp. xxvi–xxvii.

Strzalkowski, Tomek and Barbara Vauthey, "Information Retrieval Using Robust Natural Language Processing," in *Proceedings of the Conference for the 30th Annual Meeting of the Association for Computational Linguistics*, Jun. 28–Jul. 2, 1992, University of Delaware, Delaware, pp. 104–110.

"Word Formation," *Collins Cobuild English Guides 2*, Harper Collins Publishers, The University of Birmingham, pp. 48–49.

Amsler, Robert A., "The Structure of the Merriam–Webster Pocket Dictionary," dissertation, University of Texas at Austin, 1980, pp. iv–v, 1–5, 130–131.

Krovetz, Robert, "Viewing Morphology as an Inference Process," in *Proceedings of the ACM–SIGIR Conference on Research and Development in Information Retrieval*, 1993, pp. 191–202.

Pentheroudakis, Joseph E. and Dan W. Higinbotham, "MORFOGEN—A Morphology Grammar Builder and Dictionary Interface Tool," presented at the 1991 meeting of the Deseret Language and Linguistics Society, Brigham Young University, Utah, pp. 1–19.

(List continued on next page.)

*Primary Examiner*—Gail O. Hayes
*Assistant Examiner*—Frantzy Poinvil
*Attorney, Agent, or Firm*—Seed and Berry LLP

[57] ABSTRACT

A method and system for determining the derivational relatedness of a derived word and a base word. In a preferred embodiment, the system includes a machine-readable dictionary containing entries for head words and morphemes. Each entry contains definitional information and semantic relations. Each semantic relation specifies a relation between the head word with a word used in its definition. Semantic relations may contain nested semantic relations to specify relations between words in the definition. The system compares the semantic relations of the derived word to the semantic relations of a morpheme, which is putatively combined with the base word when forming the derived word. The system then generates a derivational score that indicates the confidence that the derived word derives from the base word.

28 Claims, 2 Drawing Sheets

OTHER PUBLICATIONS

Neff, Mary S. and Bravamir K. Bogaraev, "Dictionaries, Dictionary Grammars and Dictionary Entry Parsing," in *Proceedings of the Conference for the 27th Annual Meeting of the Association for Linguistics*, 1989, University of Bristish Columbia, Vancouver, B.C., Jun. 26–19, 1989, pp. 91–101.

Ahlswede, Thomas and Martha Evens, "Parsing vs. Text Processing in the Analysis of Dictionary Definitions," in *Proceedings of the Conference for the 26th Annual Meeting of the Association for Computational Linguistics*, State University of New York at Buffalo, New York, Jun. 7–10, 1988, pp. 217–224.

Markowitz, Judith et al., "Semantically Significant Patterns in Dictionary Definitions," in *Proceedings Of the Conference for the 24th Annual Meeting of the Association for Computational Linguistics*, Columbia University, New York, Jun. 10–13, 1986, pp. 112–119.

Chodorow, Martin S. et al., "Extracting Semantic Hierarchies from a Large On-Line Dictionary," in *Proceedings of the Conference for the 23rd Annual Meeting of the Association for Computational*, University of Chicago, Illinois, Jul. 8–12, 1985, pp. 299–304.

Dolan, William et al., "Automatically Deriving Structured Knowledge Bases from On-Line Dictionaries," *Proceedings of the Conference for The First Conference of the Pacific Association for Computational Linguistics*, The Harbour Centre Campus of Simon Fraser University, Vancouver, B.C., Apr. 21–24, 1993, Columbia, pp. 5–14.

Dumitrescu, Cristian, "Lexicon Design Using a Paradigmatic Approach," in *Proceedings of the Conference for the Third Conference on Applied Natural Language Processing*, Trento, Italy, Association for Computational Linguistics, Mar. 31–Apr. 3, 1993, pp. 247–248.

Russell, G.J. et al., "A Dictionary and Morphological Analyser for English," in *Proceedings for the 11th International Conference on Computational Linguistics*, Aug. 25–29, 1986, pp. 277–279.

Adriaens, Geert and Steven L. Small, "Word Expert Parsing Revisited in a Cognitive Science Perspective," *Lexical Ambiguity Resolution: Perspectives from Psycholinguistics, Neuropsychology, and Artificial Intelligence*, Morgan Kaufmann Publishers, Inc., San Mateo, California, pp. 13–43.

Sproat, Richard, "Computational Morphology," *Morphology and Computation*, The MIT Press, Cambridge, Mass., pp. 124–131.

Montemagni, Simonetta and Lucy Vanderwende, "Structural Patterns vs. String Patterns for Extracting Semantic Information from Dictionaries," in *Proceedings of the Fifteenth International Conference on Computational Linguistics*, Nantes, Aug. 23–28, 1992, pp. 546–553.

"Quirk, Randolph et al., *A Comprehensive Grammar of the English Language,*", Longman, New York, pp. 1548–1549.

Marchand, Hans, *The Categories and Types of Present–Day English Word–Formation: A Synchronic–Diachronic Approach*, C.H. Beck'sche Verlagsbuchhandlung, Munich, Germany, pp. 273–281.

Carroll, John and Claire Grover, "The derivation of a large computational lexicon for English from LDOCE, in Boguraev and Briscoe (eds.), " *Computational Lexicography for Natural Language Processing*, Longman, New York, pp. 117–183.

Calzolari, Nicoletta, "The dictionary and the thesaurus can be combined," in Evens (ed.) *Relational models of the lexicon: Representing knowledge in semantic networks;* Chapter 3, Cambridge University Press, pp. 75–96.

Binot, Jean–Louis and Karen Jensen, "A Semantic Expert Using an Online Standard Dictionary," in Jensen et al. (eds.), *Natural Language Processing: The PLNLP Approach*, Kluwer Academic Publishers, Boston, 1987, pp. 135–147.

METHOD AND SYSTEM FOR AUTOMATICALLY IDENTIFYING MORPHOLOGICAL INFORMATION FROM A MACHINE-READABLE DICTIONARY

TECHNICAL FIELD

This invention relates generally to a computer system for deriving semantic information from machine-readable dictionaries, and more specifically, to a method and system for identifying morphologically related words in machine-readable dictionaries.

BACKGROUND OF THE INVENTION

Machine-readable dictionaries (MRDs) often contain definitional information for each word in such a way that that information is accessible by a computer program. Typically, MRDs contain explicit and complete information making it possible to identify inflected forms of words. That information may appear in the form of orthographic rules or as a list of regular and irregular forms. Regular inflectional forms can be derived from rules in the "Guide to the Dictionary," which is typically included with the dictionary. Irregular inflectional forms are explicitly listed in dictionary entries. For example, the entry for the verb "sing" lists the irregular forms "sang" and "sung" and the regular forms "sings" and "singing."

However, MRDs typically contain only implicit and scant information or word formation (derivation). Thus, it is difficult for even a human user to construct a list of all words derived from a given word. For example, the following words, which are morphologically related to the verb "believe," are defined separately in typical MRDs: "belief," "believe," "believable," "unbelievable," "believer," "disbelief," "disbelieve," "unbelief," "unbelieving," and "unbelievingly." These words are not marked explicitly in the dictionary as being morphologically related. The word "believe" is the base word of these derived words.

The word "believer" is formed from the base word "believe" and the morpheme "er." A morpheme is a meaningful linguistic unit that cannot be further divided into meaningful parts. Automated methods have been developed for parsing a derived word into its component parts: putative base word and morpheme. Generally, these methods use finite state morphological analysis as described in Sproat, R., "Morphology and Computation," The MIT Press, 1992. Finite state morphological analysis applies morpheme-based rules to identify the component parts. For example, one rule may be that the morpheme "ize" attached to a noun or an adjective creates a verb. Thus, the word "hospitalize" can be parsed into "hospital" and "ize." Conversely, the word "maize" would not parse into "ma" and "ize," because "maize" is a noun and not a verb. However, successful parsing of a word does not guarantee a morphological relationship between the word and its putative base word. For example, the word "flower" may parse into "flow" and "er," but the word "flower" is not morphologically related to the word "flow."

MRDs, however, may include some form of overt markings of morphological relatedness. Specifically, some undefined forms may be listed at the end of the dictionary entry for the word from which they are ultimately derived. The MRDs assume that the meaning of these words should be clear when the meaning of the suffix is added to the meaning of the base word. For example, the dictionary entry for the word "journalism" may indicate that the form "journalistic" is derived from that word.

These overt markings, however, do not provide complete or systematic list of morphologically related words. Natural language processing systems, which need to model the knowledge of the speakers of the language, can benefit from access to complete and systematic morphological information. Although this information can be derived manually, the size of MRDs makes this derivation time-consuming and makes it difficult to ensure completeness. It would be desirable to have an automated method for deriving morphological information from a MRD. Further, it would be desirable to have an automated method for determining when a word does not derive from a putative base word. For example, this method would automatically determine that the noun "flower" does not derive from the verb "flow."

SUMMARY OF THE INVENTION

The present invention provides a method and system for determining the derivational relatedness of a derived word and a base word. In a preferred embodiment, the system includes a database with an entry for each head word and morpheme. Each entry contains definitional information from a machine-readable dictionary and semantic relations extracted from the definitions. Each semantic relation specifies a relation between the head word with a word used in its definition. Semantic relations may contain nested semantic relations to specify relations between words in the definition. The system identifies a putative base word of a derived word preferably using finite state morphological analysis. The system then compares the semantic relations of the derived word to the semantic relations of the morpheme, which is augmented with the base word. The system generates a derivational score that indicates the confidence that the derived word derive from the base word.

DETAILED DESCRIPTION OF THE INVENTION

The present invention provides a system and method for automatically identifying morphologically related words. In a preferred embodiment, the system, known as Morels for morphological relation system, determines whether a word, known as a derived word, is indeed derived from a putative base word identified preferably using finite state morphological analysis. The system assigns a derivational score to the putative derivation indicating the likelihood that the derived word is a derivative of the base word. To determine the score, the system preferably uses a database containing semantic relations for each head word and morpheme in a machine-readable dictionary (MRD). A head word is a word for which the dictionary contains an entry. A morpheme is a meaningful linguistic unit that cannot be divided into further meaningful parts (e.g., "er," "ed," "ing," and "ion"). A derived word is considered to be a combination of the putative base word and a morpheme. The system compares the semantic relations of the morpheme augmented with the base word to the semantic relations for the derived word. A semantic relation (e.g., genus, subject, object) expresses a relation between a head word and a word in the definition. In a preferred embodiment, the semantic relations are generated automatically by parsing the definition of a head word. Based on the comparison, the system assigns a derivational score to the putative derivation. This derivational score indicates the likelihood that the derived word derives from the putative base word.

Figure 1:
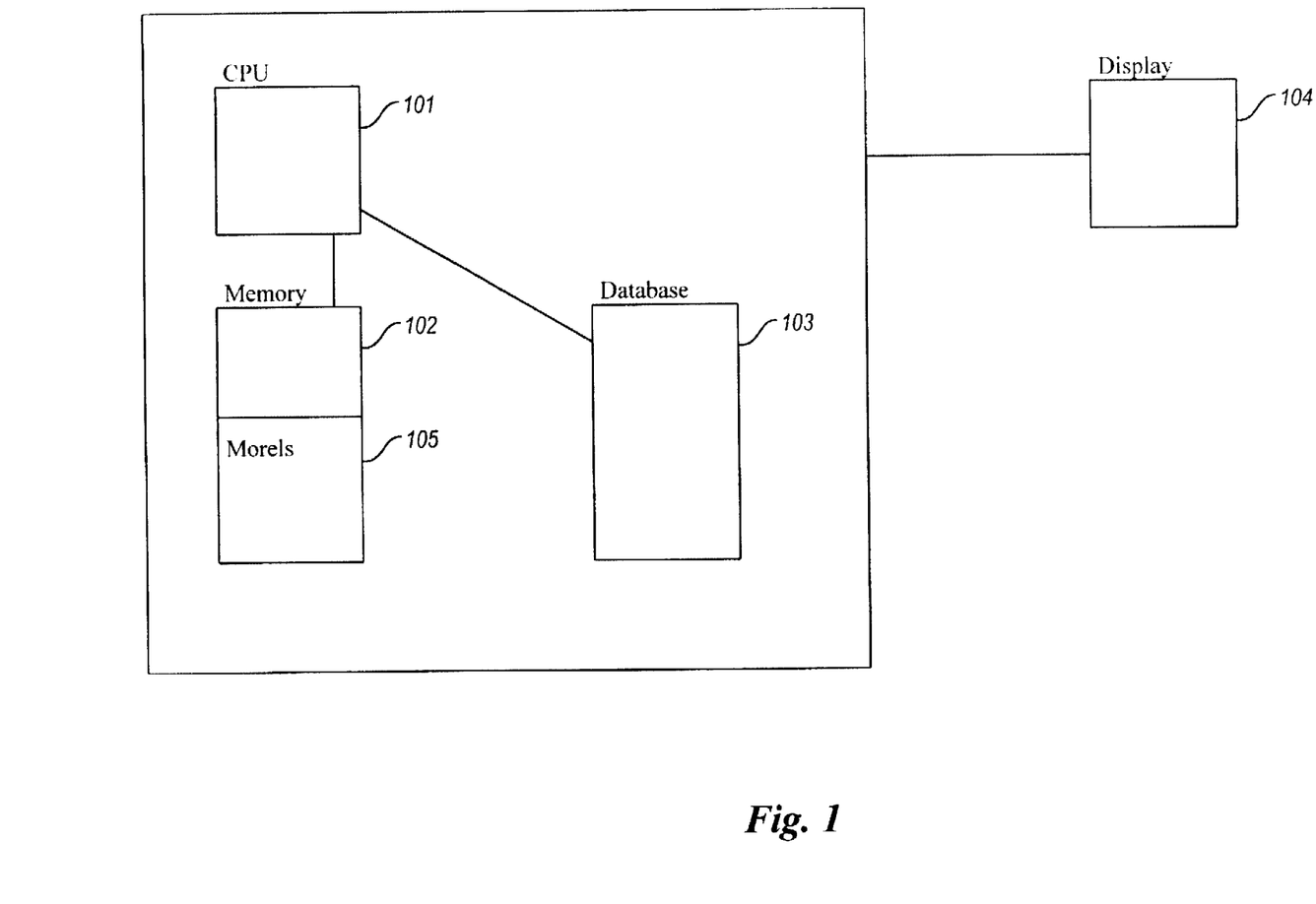
FIG. 1 is a block diagram of a computer system of a preferred embodiment.

FIG. 1 is a block diagram of a computer system of a preferred embodiment. The computer system includes a central processing unit 101, a memory 102, a database 103, and a display 104. The memory contains executable computer code 105 implementing a preferred embodiment of the present invention. The database contains a dictionary with semantic relations specified.

In a preferred embodiment, the database contains an entry for each head word and morpheme of a dictionary. Each head word entry contains a list of semantic relations for each sense (different definition) of the head word. Each semantic relation comprises an attribute (type) and has as its value a list of one or more semantic records. A semantic record contains a lemma value and optionally one or more nested semantic relations. A lemma value is the uninflected form of the word, which is typically the form under which the word is listed in the dictionary as a head word. For example, the lemma of "takes," "taking," "took," and "taken" is the form "take" and the lemma of "children" is "child."

TABLE 1

{HeadWord "banker"
Senses
 Defin "a person who owns or controls or shares in the control of a
 bank"
 Hypernym
  {Lemma "person"}
 SubjOf
  {Lemma "own"
  HasObj
   {Lemma "bank"}}
  {Lemma "control"
  HasObj
   {Lemma "bank"}}
  {Lemma "share"
  HasObj
   {Lemma "bank"}}
 }
 {Defin "the player who keeps the bank in various games of chance"
 Hypernym
  {Lemma "player"}
 SubjOf
  {Lemma "keep"
  LocatedAt
   {Lemma "game"
   PartOf
    {Lemma "chance"}}
  HasObj
   {Lemma "bank"}}
 }
}

Table 1 contains the entry for the head word "banker." The entry contains two definitions or senses: (1) "a person who owns or controls or shares in the control of a bank" and (2) "the player who keeps the bank in various games of chance." Each sense contains the definition of the sense and the list of semantic relations for that sense. The first sense contains two semantic relations. The first semantic relation is Hypernym
 {Lemma "person"}

The semantic relation type is "Hypernym," and its value is the semantic record "{Lemma "person"}." The lemma value is "person," and the semantic record contains no nested semantic relations. The second semantic relation is SubjOf
 {Lemma "own"
 HasObj
  {Lemma "bank"}}
 {Lemma "control"
 HasObj
  {Lemma "bank"}}
 {Lemma "share"
 HasObj
  {Lemma "bank"}}

The semantic relation type is "SubjOf," and its value is a list of three semantic records. Each semantic record contains a nested semantic relation with the semantic relation type of "HasObj."

An unnested semantic relation relates to the head word (the related-to word). A nested semantic relation relates to the lemma value (the related-to word) of the nesting semantic record. A "Hypernym" type identifies that the lemma value is the genus for which the related to word is a species. A "SubjOf" type identifies that the related-to word is the subject of the lemma value. A "HasObj" type identifies that the lemma value is the object of the related-to word. A "PartOf" type identifies that the related-to word is part of the lemma value. For example, the semantic relations for the first sense of "banker" indicate that "banker" is a kind of "person" (Hypernym), that "banker" is the subject of "own" (SubjOf, and that "bank" is the object of "own" (HasObj). Table 2 contains examples illustrating the meaning of various types of semantic relations.

TABLE 2

| SEMANTIC RELATIONS 301 | EXAMPLE | EXAMPLE DEFINITION |
|---|---|---|
| Actor | baton —(Actor)→ policeman | baton: a short thick stick used as a weapon by a policeman |
| ByMeansOf | boil —(ByMeansOf)→ cook | to boil: to cause to reach the stated condition by cooking in water |
|  | language —(ByMeansOf)→ word | language: the system of human expression by means of words |
| CausedBy | disease —(CausedBy)→ infection, growth | disease: (an) illness or disorder caused by infection or unnatural growth, not by an accident |
| Causes | germ —(Causes)→ disease | germ: a very small living thing which cannot be seen but may live on food or dirt or in the body, so causing disease |
| DegreeOf | height —(DegreeOf)→ tall, high | height: the quality or degree of being tall or high |
| Domain | stock —(Domain)→ cook | stock: a liquid made from the juices of meat, bones, etc. used in cooking |
| HasObj | reef (HasObj)→ sail | to reef: to tie up (part of a sail) so as to reduce the size |
| HasPart | oak —(HasPart)→ wood | oak: any of several types of large tree with hard wood |
| HasSubj | gallop —(HasSubj)→ horse | to gallop: (of a horse) to go at the fastest speed |
| Hypernym | oak —(Hypernym)→ tree | oak: any of several types of large tree with hard wood |
| InstrumentFor | hammer —(InstrumentFor)→ | hammer: a tool with a |

TABLE 2-continued

| SEMANTIC RELATIONS 301 | EXAMPLE | EXAMPLE DEFINITION |
|---|---|---|
| | drive, strike | heavy head for driving nails into wood, or for striking things to break them or move them |
| IsFor | facing —(IsFor)→ protection, ornament | facing: an outer covering or surface, as of a wall, for protection, ornament, etc. |
| | fair —(IsFor)→ sell | fair: a market, esp. one held at a particular place at regular periods for selling farm produce |
| LocatedAt | hammer —(LocatedAt)→ ear | hammer: a bone in the ear |
| LocationOf | market —(LocationOf)→ meet | market: a building, square, or open place where people meet to buy and sell goods, esp. food, or sometimes animals |
| MadeInto | nylon —(MadeInto)→ cloth, cord, plastic | nylon: a strong elastic material made from coal, water, and air and made into cloth, cords, plastics |
| MadeOf | nylon —(MadeOf)→ coal, water, air | nylon: a strong elastic material made from coal, water, and air and made into cloth, cords, plastics |
| Manner | gawp —(Manner)→ foolish | to gawp: to look at something in a foolish way, esp. with the mouth open |
| | pleasure —(Manner)→ happiness, satisfaction | pleasure: the state or feeling of happiness or satisfaction |
| ObjOf | arbitrator —(ObjOf)→ choose | arbitrator: a person chosen by both sides of an argument to examine the facts and make a decision to settle the argument |
| PartOf | bone —(PartOf)→ skeleton | bone: any of numerous anatomically distinct structures making up the skeleton of a vertebrate animal |
| Possessor | navy —(Possessor)→ country | navy: the ships of war belonging to a country |
| Purpose | additive —(Purpose)→ improve, add | additive: a substance added in small quantities to something else, as to improve the quality, or add color, taste, etc. |
| SubjOf | riveter —(SubjOf)→ fasten | riveter: a person whose job is fastening rivets |
| | fruit —(SubjOf)→ grow, contain | fruit: an object that grows on a tree or a bush and contains seeds |
| Synonym | disposal—(Synonym)→ arrangement | disposal: arrangement |
| | lyricist —(Synonym)→ songwriter | lyricist: a writer of lyrics; songwriter |
| TimeOf | summer —(TimeOf)→ hot, flower | summer: the season between spring and autumn when the sun is hot and there are many flowers |

The semantic relations for morphemes are similar to those for head words. Table 3 contains the morpheme entry for the morpheme "er."

TABLE 3

```
{Morpheme "er"
  {Defin "a person who knows about or works at"
  Hypernym
    {Lemma "person"
    Morels 2}
  SubjOf
    {Lemma ("know", "work")
    Morels 2
      HasObj
        {Lemma "base word"
        Morels 10}}}
}
```

Morpheme semantic relations contain Morels values. A Morels value indicates the amount by which a derivational score is to be increased when structural isomorphism and equivalent lemma values are encountered during the evaluation of morphological relatedness between the derived word and the putative base word. Structural isomorphism occurs when words have similar hierarchy of semantic relation types. For example, a head word entry with a "Hypernym" and "SubjOf" semantic relation and with a "HasObj" semantic relation nested within the "SubjOf" semantic relation is structurally isomorphic to the morpheme "er." The lemma value of "base word" indicates that the putative base word should be inserted to complete the semantic relations for the putative base word combined with the morpheme. As shown in Table 3, the lemma value for a morpheme may be represented by a list of lemma values ("know", "work") when their semantic records are structurally isomorphic with equivalent lemma values.

The semantic relations for each head word of dictionary database may be generated manually or automatically. In a preferred embodiment, the system uses a database generated as described by Dolan, Vanderwende, and Richardson in *Proceedings of the First Conference of the Pacific Association for Computational Linguistics,* 1993, pp. 5–14; Jensen and Binot, "A Semantic Expert Using On-Line Standard Dictionary," reprinted in *Natural Language Processing: The PLNLP Approach,* 1992, chap. 11; and Montemagni and Vanderwende, *Proceedings of Coling,* 1992, pp. 546–52, all of which are hereby incorporated by reference. Since the number of morphemes in a dictionary is relatively small, the Morels values and the morpheme semantic relations are preferably manually entered into the database. Although the preferred embodiment is described using a MRD with semantic relations already specified, one skilled in the art would appreciate that the semantic relation information can be dynamically generated during derivational analysis from definitional information in the MRD.

The system generates a derivational score for a sense of a derived word that indicates the likelihood that the derived word is a derivation of a putative base word and a morpheme. In a preferred embodiment, the system generates an instance of the morpheme semantic relations inserting the putative base word where indicated. The system then selects each semantic relation of the instantiated morpheme and determines whether the derived word has a semantic relation of the same type. If the derived word has such a semantic relation and the lemma value of the instantiated morpheme and the derived word are equal, then the system increases the derivational score. If the lemma values are not equal and the semantic relation type is a "Hypernym," then the system determines whether the lemma value of the derived word is related to the lemma value of the instantiated morpheme. If the semantic relation type is not "Hypernym," then the system determines if the base word is related to the lemma value of the derived word. The system then recursively determines whether nested semantic relations of the instantiated morpheme are related to the nested semantic relations of the derived word.

Figure 2:
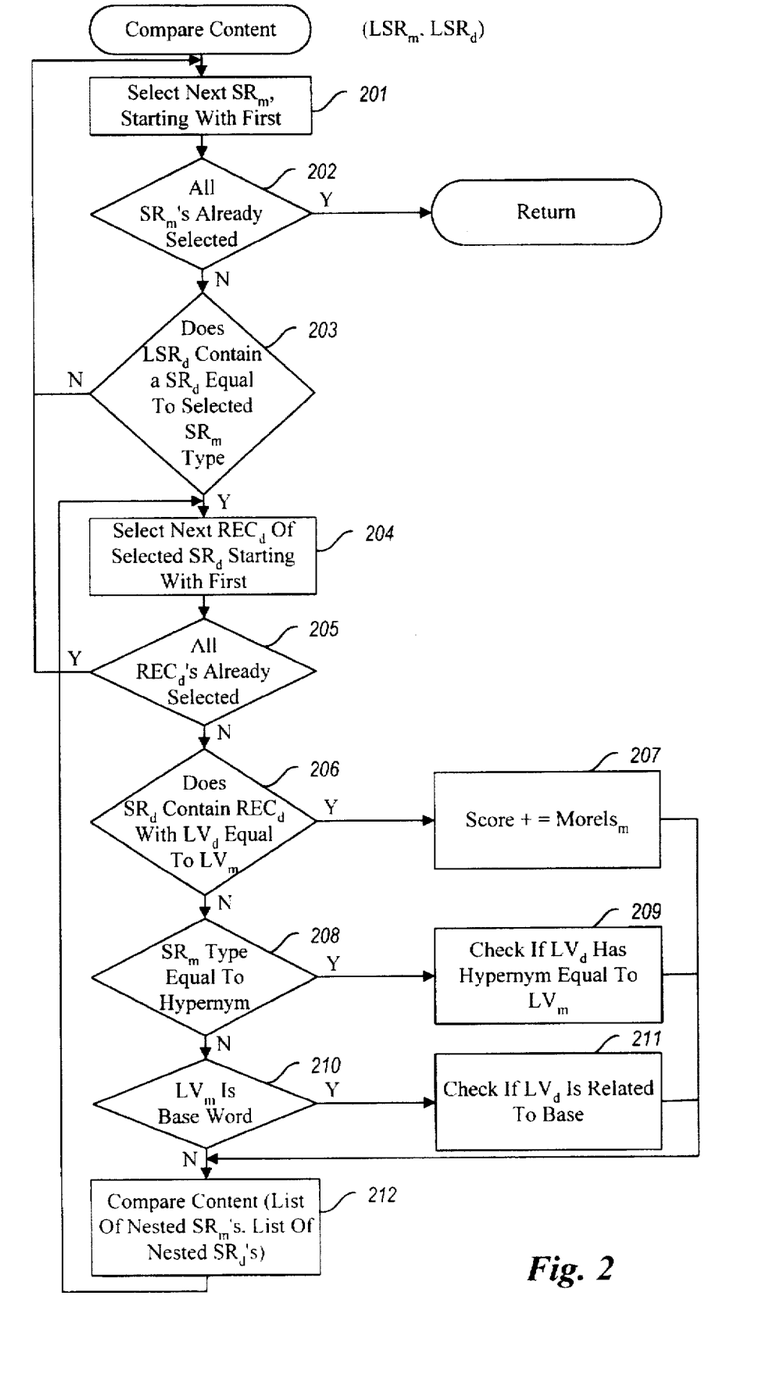
FIG. 2 is a flow diagram of a function CompareContent.

FIG. 2 is a flow diagram illustrating a CompareContent function of the system. The function is passed a list of semantic relations for a morpheme ($LSR_m$) and a list of semantic relations for a derived word ($LSR_d$). The function determines derivational relatedness of the derived word and the putative base word. The function recursively invokes itself to process nested semantic relations. The function is initially invoked with a global derivational score set to zero. The function increases the derivational score to indicate derivational relatedness. In step 201, the function selects the next semantic relation ($SR_m$) of the morpheme starting with the first semantic relation in $LSR_m$. The function loops processing each semantic relation in the morpheme. In step 202, if all the semantic relations for the morpheme have already been selected, then the function returns, else the function continues at step 203. In step 203, if the list of semantic relations ($LSR_d$) for the derived word contains a semantic relation ($SR_d$) with a type equal to the selected semantic relation ($SR_m$) of the morpheme, then the function continues at step 204, else the function loops to step 201 to select the next semantic relation ($SR_m$) of the morpheme. In step 204, the function selects the next semantic record ($REC_d$) of the selected semantic relation ($SR_d$) of the derived word starting with the first semantic record. In step 205, if all semantic records ($REC_d$) have already been selected, then the function loops to step 201 to select the next semantic relation ($SR_m$) of the morpheme, else the function continues at step 206. In step 206, if the selected semantic relation of the derived word ($SR_d$) contains a semantic record ($REC_d$) with a lemma value ($LV_d$) equal to a lemma value ($LV_m$) of the selected semantic relation ($SR_m$) of the morpheme, then the function continues at step 207, else the function continues at step 208. In step 207, the function increments the derivational score by the Morels value of the selected semantic relation ($SR_m$) of the morpheme and continues at step 212. In step 208, if the selected semantic relation ($SR_m$) of the morpheme is a type equal to "Hypernym", then the function continues at step 209, else the function continues at step 210. In a preferred embodiment, the system ensures that the derived word and base word combined with the morpheme are species of the same genus. Thus, when lemma values for "Hypernym" semantic relations are not equal, the system determines whether the lemma value for the derived word is related to the base word. The system determines this relatedness by comparing the "Hypernym" lemma values of the head word entry for the lemma value of the derived word to the lemma value of the morpheme. One skilled in the art would appreciate that other techniques may be used for checking whether the putative base word, in combination with the morpheme, is within the same genus as the derived word. For example, the system could be adapted to check "Synonym" semantic relations. In step 209, the function retrieves the dictionary entry for the head word equal to the lemma value ($LV_d$) of the selected semantic record ($SR_d$). If the retrieved dictionary entry contains a semantic relation ($SR_h$) with a type of "Hypernym," and the semantic relation ($SR_h$) contains a semantic record ($REC_h$) with its lemma value ($LV_h$) equal to the lemma value ($LV_m$) of the morpheme, then the function increments the derivational score by the Morels value of the selected semantic record ($REC_m$) and continues at step 212. In step 210, if the lemma value ($LV_m$) of the semantic record ($REC_m$) indicates the base word, then the function continues at step 211, else the function continues at step 212. In step 211, the function determines whether the lemma value ($LV_d$) is related to the base word. This relatedness of words can be determined in several ways. In a preferred embodiment, a derived word is related to a base word when the base word contains a semantic relation type (regardless of nesting) equal to the semantic relation type of the selected semantic relation ($SR_m$) of the morpheme and the lemma value ($LV_d$) of the derived word equals the lemma value ($LV_b$) of the base word. If the base word is related to the derived word, then the function increments the derivational score by the Morels value in the selected semantic record ($REC_m$) of the morpheme. In step 212, the function invokes the function CompareContent recursively passing the list of nested semantic relations ($SR_m$) of the morpheme and the list of nested semantic relations ($SR_d$) of the derived word.

In the following examples, the system determines whether a sense of a derived word is derived from a sense of putative base word and the "er" morpheme. These examples illustrate (1) when the semantic relations in the derived word and those in the morpheme are structurally isomorphic and the lemma values in the semantic relations of the derived word are equivalent to those in the morpheme, (2) when the "Hypernym" semantic relations in the derived word and the morpheme have non-equal but related values, (3) when the "non-Hypernym" semantic relations in the derived word and the morpheme have non-equal but related values, and (4) when there is no relatedness. In the first example in which the semantic relations of the derived word are structurally isomorphic to those in the morpheme and the lemma values in the semantic relations of the two are equivalent, the system calculates a the word derivational score for the word "geographer" analyzed as the base word "geography" combined with the "er" morpheme.

TABLE 4

{Morpheme "er"
  {Defin "a person who knows about or works at"
  Hypernym
    {Lemma "person"
    Morels 2}
  SubjOf
    {Lemma ("know", "work")
    Morels 2
    HasObj
      {Lemma "geography"
      Morels 10}}}
}
{HeadWord "geographer"
Senses
  {Defin "a person who studies and knows about geography"
  Hypernym
    {Lemma "person"}
  SubjOf
    {Lemma "study"
    HasObj
      {Lemma "geography"}}
    {Lemma know"
    HasObj
      {Lemma "geography"}}}
}

Table 4 contains the entry for the "er" morpheme with the base word "geography" inserted, and entry for the word "geographer". To determine the score, the system applies the function CompareContent to a list of the semantic relations of the morpheme and a list of semantic relations of "geographer." The system first selects the "Hypernym" semantic relation of the morpheme and the "Hypernym" semantic relation of "geographer." The following chart shows this selection.

| "er" | "geographer" |
|---|---|
| Hypernym<br>{Lemma "person"<br>Morels 2} | Hypernym<br>{Lemma "person"} |

The system then determines that the lemma values "person" are equal, and increases the derivational score by the Morels value of 2 for a total of 2.

The system then selects the "SubjOf" semantic relation in the morpheme and the "SubjOf" semantic relation of "geographer." The following chart shows this selection.

| "er" | "geographer" |
|---|---|
| SubjOf<br>{Lemma ("know", "work")<br>Morels 2<br>HasObj<br>{Lemma "geography"<br>Morels 10}} | SubjOf<br>{Lemma "study"<br><br>HasObj<br>{Lemma "geography"}}<br><br>{Lemma "know"<br>HasObj<br>{Lemma "geography"}} |

The system processes each semantic record of "geographer." The following chart shows the first semantic relation.

| "er" | "geographer" |
|---|---|
| SubjOf<br>{Lemma ("know", "work")<br>Morels 2<br>HasObj<br>{Lemma "geography"<br>Morels 10}} | SubjOf<br>{Lemma "study"<br><br>HasObj<br>{Lemma "geography"}} |

Since the lemma value "study" is not in the list of lemma values of the morpheme, the derivational score is not increased. The system then determines if the nested semantic relations of the morpheme matcha nested semantic relation of "geographer." Since both the morpheme and "geographer" have a "HasObj" semantic relation with a lemma value of "geography," the system increases the derivational score by the Morels value of 10 for a total of 12.

The system then selects the second semantic record of "geographer." The following chart shows this selection.

| "er" | "geographer" |
|---|---|
| SubjOf<br>{Lemma ("know", "work")<br>Morels 2<br>HasObj<br>{Lemma "geography"<br>Morels 10}}} | SubjOf<br>{Lemma "know"<br><br>HasObj<br>{Lemma "geography"}} |

Since the lemma value "know" is in the list of lemma values of the morpheme, the derivational score is increased by the Morels value of 2 for a total of 14.

The system then determines if the nested semantic relations of the morpheme matcha nested semantic relation of "geographer." Since both the morpheme and the entry for "geographer" have a "HasObj" semantic relation with a lemma value of "geography," the system increases the derivational score by the Morels value of 10 for a total of 24.

The derivational score of 24 indicates the likelihood that "geographer" is derived from "geography."

In the second example in which "non-Hypernym" semantic relations have non-equal but related lemma values, the system calculates a derivational score for the derived word "cartographer" analyzed as the base word "cartography" with the "er" morpheme.

TABLE 5

```
{Morpheme "er"
  {Defin "a person who knows about or works at"
  Hypernym
    {Lemma "person"
    Morels 2}
  SubjOf
    {Lemma ("know", "work")
    Morels 2
    HasObj
      {Lemma "cartography"
      Morels 10}}}
}
{HeadWord "cartographer"
Senses
  {Frgom "a person who makes maps"
  Hypernym
    Lemma "person"}
  SubjOf
    {Lemma "make"
    HasObj
      {Lemma "map"}}}
}
```

Table 5 contains the entry for the "er" morpheme with the base word "cartography" inserted, and the entry for "cartographer". To determine the score, the system applies the function CompareContent to a list of the semantic relations of the morpheme and a list of semantic relations of "cartographer." The system first selects the "Hypernym" semantic relation of the morpheme and the "Hypernym" semantic relation of "cartographer." The following chart shows this selection.

| "er" | "cartographer" |
|---|---|
| Hypernym<br>{Lemma "person"<br>Morels 2} | Hypernym<br>Lemma "person"} |

The system then determines that the lemma values "person" are equal, and increases the derivational score by the Morels value of 2 for a total of 2.

The system then selects the "SubjOf" semantic relation of the morpheme and the "SubjOf" semantic relation of "cartographer." The following chart shows this selection.

| "er" | "cartographer" |
|---|---|
| SubjOf<br>{Lemma ("know", "work")<br>Morels 2<br>HasObj<br>{Lemma "cartography"<br>Morels 10}} | SubjOf<br>{Lemma "make"<br><br>HasObj<br>{Lemma "map"}} |

The system processes each semantic record of "cartographer." Since the lemma value "make" is not in the list of lemma values of the morpheme, the derivational score is not increased. The system then determines if the nested semantic relations of the morpheme matches a nested semantic relations of "cartographer." Since both the morpheme and "cartographer" have an "HasObj" semantic relation, the system determines that the lemma value of "cartography" is not equal to the lemma value of "map." The system then determines whether the base word "cartography" is related to the lemma value "map" by retrieving the entry for cartography and examining its semantic relation information. The following chart show the dictionary entry for "cartography."

```
{HeadWord "cartography"
 Senses
   {Defin "the science or art of making maps"
    Hypernym
      {Lemma "make"
       Classifier
         {Lemma "art"}
         {Lemma "science"}
       HasObj
         {Lemma "map"}
```

The system determines that "cartography" has a "HasObj" (nested) semantic relation with a lemma value equal to "map." The system then increments the derivational score by the Morels value of 10 for a total of 12. The derivational score of 12 indicates the likelihood that "cartographer" is derived from "cartography."

In the third example in which "Hypernym" semantic relations have non-equal but related values, the system calculates a derivational score for the derived word "banker" analyzed as the base word "bank" with the "er" morpheme. This example uses the following sense of "banker:" "the player who keeps the bank in various games of chance."

TABLE 6

```
{Morpheme "er"
  {Defin "a person who knows about or works at"
   Hypernym
     {Lemma "person"
      Morels 2}
   SubjOf
     {Lemma ("know", "work")
      Morels 2
      HasObj
        {Lemma "bank"
         Morels 10}}}
}
{HeadWord "banker"
 Senses
   {Defin "the player who keeps the bank in various games of chance"
    Hypernym
      {Lemma "player"}
    SubjOf
      {Lemma "keep"
       LocatedAt
         {Lemma "game"
          PartOf
            {Lemma "chance"}}
       HasObj
         {Lemma "bank"}}}
}
```

Table 6 contains the entry for the "er" morpheme with the base word "bank" inserted and entry for the word "banker". To determine the score, the system applies the function CompareContent to the list of semantic relations of the morpheme and the list of semantic relations of "banker." The system first selects the "Hypernym" semantic relation of the morpheme and the "Hypernym" semantic relation of "banker." The following chart shows this selection.

| "er" | "bank" |
|---|---|
| Hypernym<br>{Lemma "person"<br>Morels 2} | Hypernym<br>{Lemma "player"} |

The system then determines that the lemma value "person" is not equal to the lemma value "player." Because there is a mismatch on the "Hypernym" semantic relation, the system then retrieves the dictionary entry for "player." The following shows the dictionary entry for "player."

```
{HeadWord "player"
 Senses
   {Defin "a person taking part in a game or sport"
    Hypernym
      {Lemma "person"}
    SubjOf
      {Lemma "take"
       HasObj
         {Lemma "part"
          LocatedAt
            {Lemma "game"}
            {Lemma "sport"}}}
   }
}
```

Since the "Hypernym" semantic relation for "player" contains a lemma value of "person," which is equal to the lemma value for the morpheme, the system increases the derivational score by the Morels value of 2 for a total of 2.

The system then selects the "SubjOf" semantic relation of the morpheme and the "SubjOf" semantic relation of "banker." The following chart shows this selection.

| "er" | "banker" |
|---|---|
| SubjOf<br>{Lemma ("know", "work")<br>Morels 2 | SubjOf<br>{Lemma "keep"<br>LocatedAt<br>{Lemma "game"<br>PartOf<br>{Lemma "chance"}} |
| HasObj<br>{Lemma "bank"<br>Morels 10}} | HasObj<br>{Lemma "bank"}} |

The system processes each semantic record of "banker." Since the lemma value "keep" is not in the list of lemma values of the morpheme, the derivational score is not increased. The system then determines if the nested semantic relations of the morpheme matches a nested semantic relation of "banker." Since both the morpheme and "banker" have a "HasObj" semantic relation with a lemma value of "bank," the system increases the derivational score by the Morels value of 10 for a total of 12.

In the fourth example in which there is no relatedness, the system calculates a derivational score the derived word "corner" and the base word "corn" with the "er" morpheme. This example uses the following sense of "corner:" "the place where 2 roads, paths, or streets meet."

TABLE 7

```
{Morpheme "er"
  {Defin "a person who knows about or works at"
   Hypernym
     {Lemma "person"
```

TABLE 7-continued

```
        Morels 2}
    SubjOf
        {Lemma ("know", "work")
        Morels 2
            HasObj
                {Lemma "corn"
                Morels 10}}}
}
{HeadWord corner
    {Defin "the place where 2 roads, paths, or streets meet"
    Hypernym
        {Lemma "place"
    LocationOf
        {Lemma "meet"
        HasSubj
            {Lemma "road"}
            {Lemma "path"}
            {Lemma "street"}}}
}
```

Table 7 contains the entry for the "er" morpheme with the base word "corn" inserted, and the entry for the word "corner". To determine the score, the system applies the function CompareContent to a list of the semantic relations of the morpheme and a list of semantic relations of "corner." The system first selects the "Hypernym" semantic relation of the morpheme and the "Hypernym" semantic relation of "corner." The following chart shows this selection.

| "er" | "corner" |
|---|---|
| Hypernym<br>{Lemma "person"<br>Morels 2} | Hypernym<br>{Lemma "place"} |

The system then determines that the lemma value "person" is not equal to the lemma value "place." Because there is a mismatch on the "Hypernym" semantic relation, the system then retrieves the dictionary entry for "place." Although not shown, the dictionary entry for "place" does not have a "Hypernym" semantic relation with a lemma value of "person." Therefore, the system does not increase the derivational score.

The system then selects the "SubjOf" semantic relation of the morpheme. Since "corner" has no "SubjOf" semantic relation, the system does not increase the derivational score. In an alternate embodiment, the system adds a negative value to the derivational score when the derived word has no corresponding semantic relation of the same type as a semantic relation of the morpheme. The adding of a negative value to the derivational score indicates that the likelihood of the derivation is reduced.

Table 8 contains pseudo-code for a more detailed algorithm used by the system to generate a derivational score indicating the likelihood that a sense of a derived word (D) can be correctly analyzed as a morpheme (M) combined with a sense of putative base word (B). The function CompareContent recursively calls itself to process nested semantic relations. The function IsRelated also recursively calls itself to determine whether the base word is related to the derived word. As shown, the function IsRelated checks for a semantic relation at any nesting level that has a type equal to the type of SRd and with a lemma value equal to the passed lemma value. In an alternate embodiment, the function IsRelated locates a structurally isomorphic position within the base word and checks for a related semantic relation. Also, in a preferred embodiment, each semantic relation of a morpheme contains an indicator of the semantic relation type that is structurally relevant. The system then checks for structural isomorphism using the indicator.

TABLE 8

Definitions:

$LSR_d$ = list of semantic relations of D
$SR_d$ = semantic relation of $LSR_d$
$REC_d$ = a record of semantic relation $SR_d$
lemma_value$_d$ = lemma value of $REC_d$
  instantiate M for Morpheme insert B in base word lemma_values
  Score = 0
  CompareContent($LSR_m$, $LSR_d$)
  CompareContent($LSR_m$, $LSR_d$)
  {for each $SR_m$ of $LSR_m$
    if $LSR_d$ contains $SR_d$ equal to $SR_m$
      for each $REC_d$ of $SR_d$
        if $RL_m$ contains a lemma_value$_m$ equals lemma_value$_d$
          score += Morels
        else if $SR_m$ is "Hypernym"
          for each sense H for the head word of lemma_value$_d$
            if $LSR_h$ contains $SR_h$ of "Hypernym"
              for each $REC_h$ of $SR_h$
                if lemma_value$_m$ equals lemma_value$_h$
                  score += Morels
                endif
              endfor
            endif
          endfor
        else if lemma_value$_m$ is base word
          if (IsRelated($LSR_b$, $SR_d$, lemma_value$_d$))
            score += Morels
          endif
        endif
        CompareContent(list of nested $SR_m$, list of nested $SR_d$)
      endfor
    endif
  endfor
}
IsRelated($LSR_b$, $SR_d$, lemma_value$_d$)
{for each $SR_b$ of $LSR_b$
  if $SR_b$ is equal to $SR_d$
    if lemma_value$_b$ is equal to lemma_value$_d$
      return (TRUE)
    endif
  endif
  if (IsRelated(list of nested SR's of $SR_b$, $SR_d$, lemma_value$_d$))
    return (TRUE)
  endif
endfor
return (FALSE)
}

Although the present invention has been described in terms of preferred embodiments, it is not intended that the invention be limited to these embodiments. Modifications within the spirit of the invention will be apparent to those skilled in the art. For example, in a preferred embodiment, the database is updated to include links from derived words to base words. The system stores the derivational score for each sense of derived words and base words. In an alternate embodiment, the system adjusts the derivational score based on (1) syntactic relatedness between the derived word and the base word, for example, by matching subcategorized prepositions on a verb sense and its derived nominalization and (2) matching other attributes between the base word and derived word. The scope of the present invention is defined by the claims that follow.

I claim:

1. A method in a computer system for determining whether a derived word is morphologically related to a putative base word combined with a morpheme, the method comprising the steps of:

combining semantic information derived from a definition of the morpheme with the putative base word;

comparing semantic information derived from a definition of the derived word to the combined semantic information; and determining whether the comparison indicates derivational relatedness of the derived word to the putative base word, the derivational relatedness indicating whether the derived word is morphologically related to the putative base word.

2. The method of claim 1 wherein the step of comparing includes the step of determining similarity of the semantic information for the derived word and the semantic information for the morpheme combined with the putative base word.

3. The method of claim 1 including the step of generating the semantic information for the derived word and the morpheme based on definitional information in a machine readable dictionary.

4. The method of claim 3 wherein the step of generating the semantic information from the definitional information is performed at the time that it is being determined whether the derived word is morphologically related to the putative base word combined with a morpheme.

5. The method of claim 3 wherein the step of generating the semantic information is performed during a preprocessing step in which the semantic information is then stored in the machine readable dictionary.

6. The method of claim 1 including the step of generating an indicator of how morphologically related the putative base word is to the derived word.

7. The method of claim 6 wherein the indicator indicates that the putative base word is not morphologically related to the derived word.

8. The method of claim 1 including the step of parsing the derived word to determine a putative base word.

9. The method of claim 1 including the step of determining a putative base word for the derived word using finite state morphological analysis.

10. The method of claims 3, 4, or 5 wherein the semantic information consists of semantic relations from definitional information.

11. A method in a computer system for determining whether a derived word is morphologically related to a putative base word combined with a morpheme, the method comprising the step of comparing semantic information for the derived word to semantic information for the morpheme combined with the putative base word wherein the comparison indicates derivational relatedness of the derived word to the putative base word, the derivational relatedness indicating whether the derived word is morphologically related to the putative base word wherein the semantic information for the derived word includes semantic relations, each semantic relation having a semantic relation type indicating a relationship between the derived word and a definitional word in definitional information for the derived word, and wherein the semantic information for the morpheme includes semantic relations, each semantic relation having a semantic relation type indicating a relationship between the morpheme and a definitional word in definitional information for the morpheme, and the step of comparing includes the steps of:

determining whether the derived word has semantic relations that are isomorphic to the semantic relations of the morpheme; and when semantic relations are isomorphic, determining whether an uninflected form of the definitional word of the morpheme semantic relation is the same or is related to an uninflected form of the definitional word of the derived word semantic relation.

12. The method of claim 11 wherein the step of determining whether the morpheme semantic relation is related to the derived word semantic relation includes the step of, when the morpheme semantic relation and the derived word semantic relation have nested semantic relations, determining relatedness based on the nested semantic relations.

13. A method in a computer system for determining whether a derived word is morphologically related to a putative base word combined with a morpheme, the method comprising the step of comparing semantic information for the derived word to semantic information for the morpheme combined with the putative base word wherein the comparison indicates derivational relatedness of the derived word to the putative base word, the derivational relatedness indicating whether the derived word is morphologically related to the putative base word wherein the semantic information for the derived word includes semantic relations, each semantic relation having a semantic relation type indicating a relationship between the derived word and a definitional word in definitional information for the derived word, and wherein the semantic information for the morpheme includes semantic relations, each semantic relation having a semantic relation type indicating a relationship between the morpheme and a definitional word in definitional information for the morpheme, and the step of comparing includes the steps of:

determining whether the derived word has semantic relations that are isomorphic to the semantic relations of the morpheme; and when semantic relations are isomorphic, determining whether the definitional word of the morpheme semantic relation is the same or is related to the definitional word of the derived word semantic relation such that when the semantic relation is a hypernym relation and the definitional words are not the same, determining relatedness based on the semantic information for the definitional word of the derived word semantic relation and the semantic information of the morpheme.

14. A method in a computer system for determining whether a derived word is morphologically related to a putative base word combined with a morpheme, the method comprising the step of comparing semantic information for the derived word to semantic information for the morpheme combined with the putative base word wherein the comparison indicates derivational relatedness of the derived word to the putative base word, the derivational relatedness indicating whether the derived word is morphologically related to the putative base word wherein the semantic information for the derived word includes semantic relations, each semantic relation having a semantic relation type indicating a relationship between the derived word and a definitional word in definitional information for the derived word, and wherein the semantic information for the morpheme includes semantic relations, each semantic relation having a semantic relation type indicating a relationship between the morpheme and a definitional word in definitional information for the morpheme, and the step of comparing includes the steps of:

determining whether the derived word has semantic relations that are isomorphic to the semantic relations of the morpheme; and when semantic relations are isomorphic, determining whether the definitional word of the morpheme semantic relation is the same or is related to the definitional word of the derived word semantic relation such that when the semantic relation is a non-hypernym relation and the definitional words are not the same, determining relatedness based on the semantic information of the putative base word and the semantic information of the derived word.

15. The method of claim 11 or 14 including the step of using the uninflected form of the definitional word when determining whether two definitional words are the same or related.

16. A computer system for determining derivational relatedness among words, comprising:

a computer having a central processing unit and storage;

a dictionary, the dictionary being stored on the storage and having an entry for each head word of the dictionary, each entry having definitional information; and a derivational computer program for receiving a derived word, a putative base word, and a morpheme, for combining semantic information derived from the definition of the morpheme with the putative base word, for comparing semantic information derived from the definition of the derived word with the combined semantic information and for generating, based on the comparison, an indicator of the derivational relatedness of the derived word to the putative base word, the derivational computer program executed in the computer system.

17. A computer system for determining derivational relatedness among words, comprising:

a computer having a central processing unit and storage;

a dictionary, the dictionary being stored on the storage and having an entry for each head word of the dictionary, each entry having definitional information; and a derivational computer program for receiving a derived word, a putative base word, and a morpheme, for comparing semantic information derived from the definition of the derived word with semantic information derived from the definition of the morpheme combined with the putative base word, and for generating, based on the comparison, an indicator of the derivational relatedness of the derived word to the putative base word, the derivational computer program executed in the computer system wherein the derivational computer program stores the generated indicator in the dictionary to indicate that the derived word derives from the putative base word with an indicated degree of confidence.

18. A computer system for determining derivational relatedness among words, comprising:

a computer having storage;

a dictionary stored in the storage and containing semantic information for words for a derived word and a putative base word; and a derivational computer program for determining whether the derived word derives from the putative base word by comparing the semantic information contained in the dictionary to semantic information derived from a definition of the derived word contained in the dictionary for the putative base word, the derivational computer program executed in the computer system.

19. A method in a computer system for determining the derivational relatedness of words, the computer system having a machine-readable dictionary and having semantic information for morphemes, the machine-readable dictionary having definitional information, the method comprising the steps of:

receiving a word;

parsing the word to generate a putative base word and a morpheme for the word;

identifying semantic information for the word based on the definitional information in the machine-readable dictionary;

augmenting the semantic information for the morpheme with the putative base word;

comparing the semantic information for the word and the augmented semantic information; and indicating the derivational relatedness of the word to the putative base word based on the comparison.

20. The method of claim 19 wherein the step of comparing includes the step of comparing isomorphically related semantic information for the derived word and the morpheme augmented with the putative base word.

21. A method in a computer system for determining the derivational relatedness of words, the computer system having a machine-readable dictionary and having semantic information for morphemes, the machine-readable dictionary having definitional information, the method comprising the steps of:

receiving a word;

parsing the word to generate a putative base word and a morpheme for the word;

identifying semantic information for the word based on the definitional information in the machine-readable dictionary; and comparing the semantic information for the word and the semantic information for the morpheme augmented with the putative base word, wherein the comparison indicates the derivational relatedness of the word to the putative base word by comparing isomorphically related semantic information for the derived word and the morpheme augmented with the putative base word and by indicating an increased likelihood of derivational relatedness when the isomorphically related semantic information has related lemma words.

22. A method in a computer system of determining whether a word is derived from a certain sense of a putative base word that is combined with a morpheme, the word and the morpheme having semantic information specifying an attribute and lemma word, the method comprising the steps of:

for each sense of the putative base word, combining the semantic information of the morpheme with the sense of the putative base word;

for each sense of the putative base word, comparing the semantic information for the word with the semantic information for the morpheme combined with that sense such that when an attribute of the semantic information for the word and an attribute of the semantic information for the morpheme are equivalent and the lemma word of that attribute for the word is related to the lemma word of that attribute for the morpheme, then a likelihood that the word derives from the putative base word is increased; and selecting the sense with the greatest likelihood as the sense from which the word is derived.

23. A method in computer system for determining that a word is not derived from a putative base word combined with a morpheme, the method comprising the steps of:

selecting hypernym semantic information for the morpheme and the word, the hypernym semantic information having a value;

determining whether the selected hypernym semantic information is related to the value of the selected hypernym information for the word; and when the value of the selected hypernym semantic information for the morpheme is not related to the value of the selected hypernym semantic information for the word, indicating that the word is not derived from the putative base word.

24. A computer-readable memory device for controlling a computer system to determine whether a derived word is morphologically related to a putative base word combined with a morpheme, by:
- combining semantic information derived from a definition of the morpheme with the putative base word;
- comparing semantic information derived from a definition of the derived word to the combined semantic information; and
- determining whether the comparison indicates derivational relatedness of the derived word to the putative base word, the derivational relatedness indicating whether the derived word is morphologically related to the putative base word.

25. A computer-readable medium containing instructions for causing a computer system to determine derivational relatedness among words, the computer system having a dictionary with an entry for each head word of the dictionary, each entry having definitional information, by:
- receiving a derived word, a putative base word, and a morpheme;
- comparing semantic information derived from the definitional information of the derived word with semantic information derived from the definitional information of the morpheme combined with the putative base word; and
- generating, based on the comparison, an indicator of the derivational relatedness of the derived word to the putative base word.

26. A computer-readable medium containing instructions for causing a computer system to determine derivational relatedness among words, the computer system having a dictionary with an entry for each head word of the dictionary, each entry having definitional information, by:
- receiving a derived word, a putative base word, and a morpheme;
- comparing semantic information derived from the definitional information of the derived word with semantic information derived from the definitional information of the morpheme combined with the putative base word; and
- generating, based on the comparison, an indicator of the derivational relatedness of the derived word to the putative base word, wherein the generated indicator is stored in the dictionary to indicate that the derived word derives from the putative base word with an indicated degree of confidence.

27. A computer-readable medium containing instructions for causing a computer system to determine whether a word is derived from a certain sense of a putative base word that is combined with a morpheme, the word and the morpheme having semantic information specifying an attribute and lemma word, by:
- for each sense of the putative base word, combining the semantic information of the morpheme with the sense of the putative base word;
- for each sense of the putative base word, comparing the semantic information for the word with the semantic information for the morpheme combined with that sense such that when an attribute of the semantic information for the word and an attribute of the semantic information for the morpheme are equivalent and the lemma word of that attribute for the word is related to the lemma word of that attribute for the morpheme, then a likelihood that the word derives from the putative base word is increased; and
- selecting the sense with the greatest likelihood as the sense from which the word is derived.

28. A computer-readable medium containing instructions for causing a computer system to determine that a word is not derived from a putative base word combined with a morpheme, by:
- selecting hypernym semantic information for the morpheme and the word, the hypernym semantic information having a value; and
- when the value of the hypernym semantic information for the morpheme is not related to the value of the hypernym semantic information for the word, indicating that the word is not derived from the putative base word.

* * * * *